Nov. 14, 1944.   E. W. MILLER   2,362,762
GEAR FINISHING MACHINE
Filed April 8, 1939   7 Sheets-Sheet 1

Inventor
Edward W. Miller
by Wright, Brown, Quinby & May
Attys.

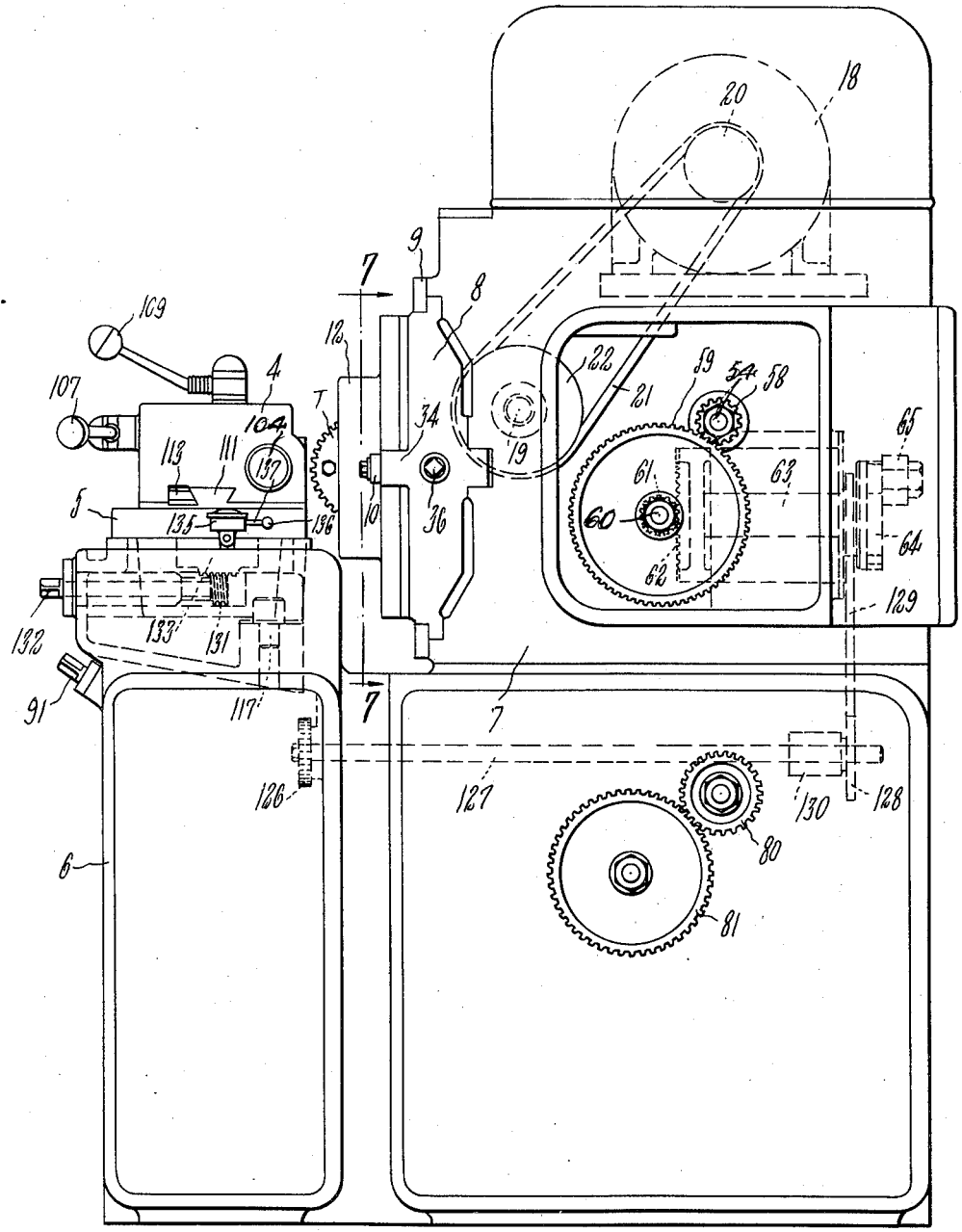

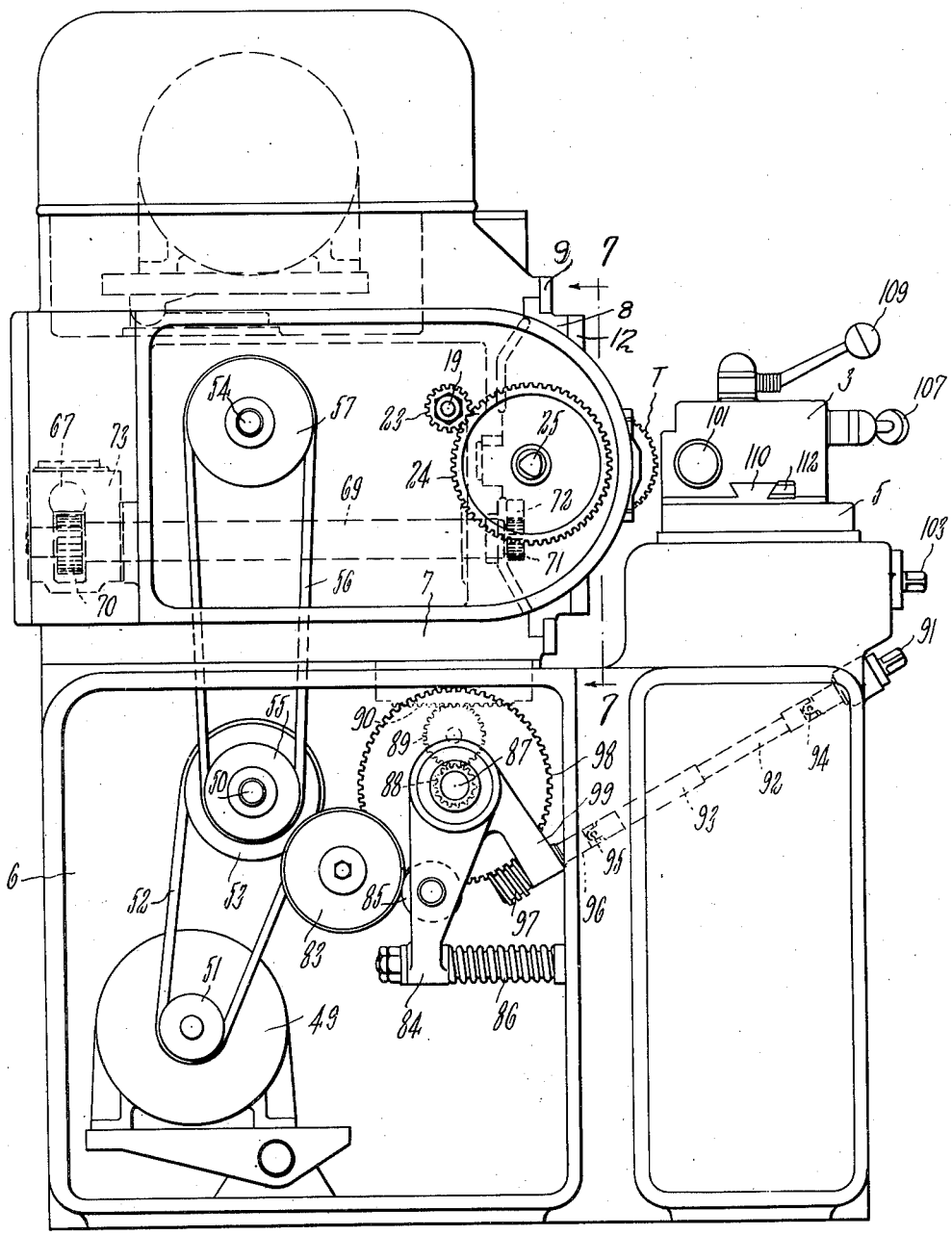

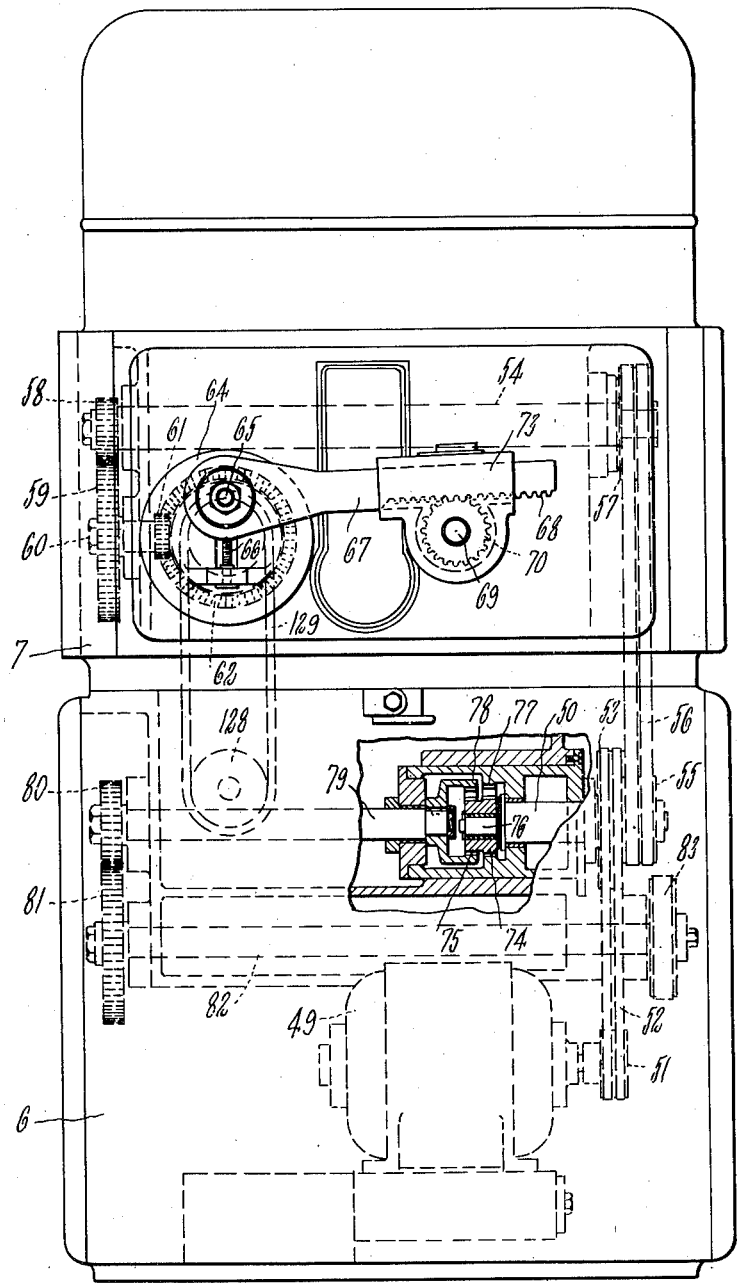

Nov. 14, 1944.   E. W. MILLER   2,362,762
GEAR FINISHING MACHINE
Filed April 8, 1939   7 Sheets-Sheet 5

Inventor
Edward W. Miller
by Wright, Brown, Quinby & May
Attys.

Nov. 14, 1944.  E. W. MILLER  2,362,762
GEAR FINISHING MACHINE
Filed April 8, 1939  7 Sheets-Sheet 6

Inventor
Edward W. Miller
by Wright, Brown, Quinby
   & May
   Attys.

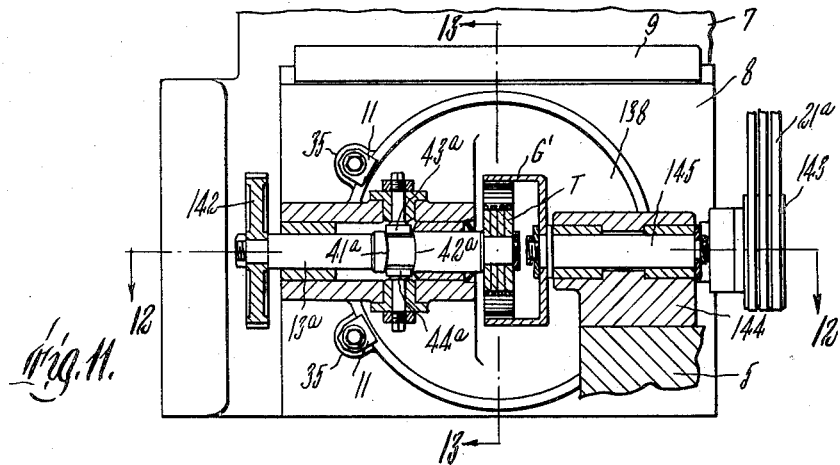
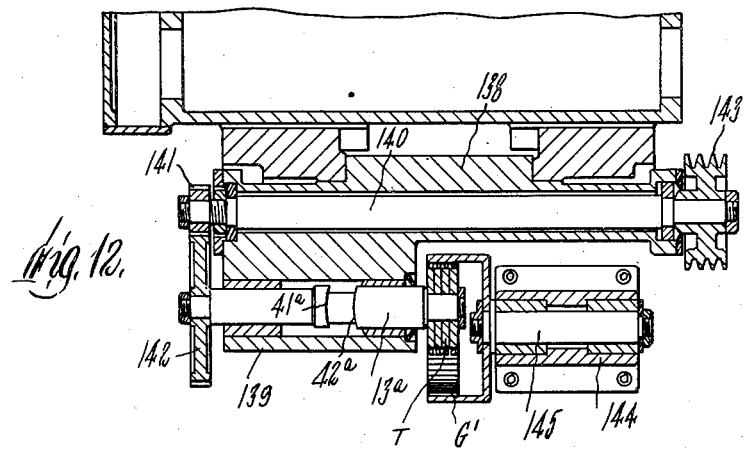
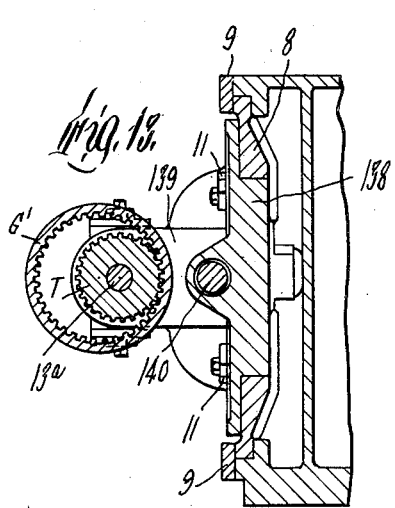
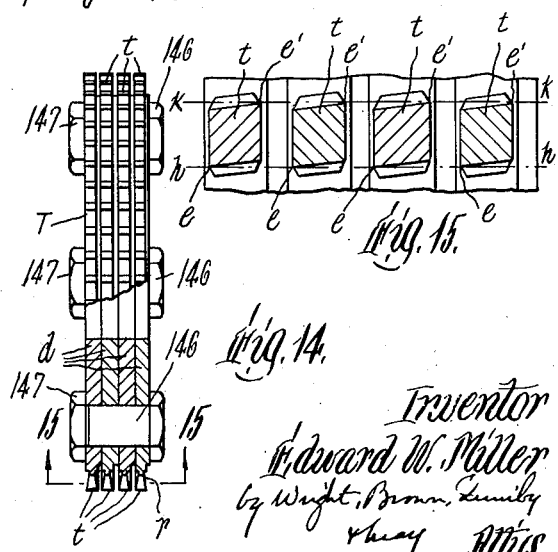

Patented Nov. 14, 1944

2,362,762

UNITED STATES PATENT OFFICE 2,362,762

GEAR FINISHING MACHINE

Edward W. Miller, Springfield, Vt., assignor to The Fellows Gear Shaper Company, Springfield, Vt., a corporation of Vermont Application April 8, 1939, Serial No. 266,854

34 Claims. (Cl. 90—1.6)

The present invention relates to machines for bringing to exact finished form and dimensions, gears which have been cut to an approximation of the prescribed contours but are oversize or contain minor errors or superficial imperfections. In the preferred embodiments of the invention the finishing is a scraping or so called shaving action performed by gear-like tools having a number of cutting edges in tandem arrangement lengthwise of their teeth. But in other embodiments the action may be that of lapping or burnishing with the use of appropriate tools.

One of the objects of the invention is to carry out a shaving process by a rapid reciprocation of the tool axially in a path parallel to the axis of the work piece, while rotating the tool and driving the work thereby, thus obtaining free and rapid cutting with the ability to remove a considerable amount of material from the work gear teeth and produce finished gears having a high quality of accuracy. A further object has been to superimpose on the fundamental reciprocatory movement of the tool a secondary reciprocation of short extent to obliterate so called tool marks on the work. Further objects are to provide means for slightly inclining the work alternately in time with the reciprocation of the tool whereby to crown the teeth of the work piece; and alternatively to set the work piece at a fixed angle to the path of the tool for the correction of gears having a tapered formation. Another object is to provide means for slightly inclining the axis of the tool in a plane transverse to that of the above mentioned inclination of the work piece axis for the purpose of correcting errors in the lead of helical gears or errors in the parallelism of the teeth of spur gears.

The invention consists in the novel principles and embodiments of machines capable of carrying out the foregoing objects and including novel combinations and subcombinations hereinafter described.

In the drawings—

Fig. 2 is a side elevation of the machine as seen from the right of Fig. 1;

Fig. 3 is a side elevation as seen from the left of Fig. 1;

Fig. 4 is a rear elevation;

Figure 7:
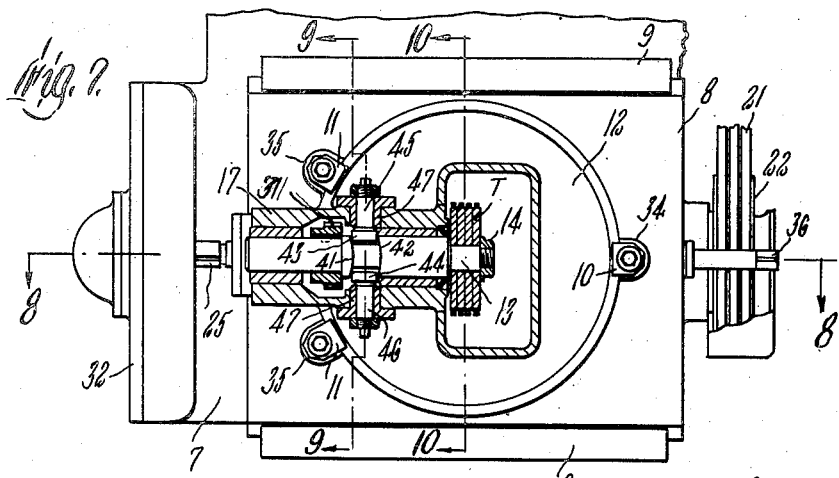
Fig. 7 is a vertical sectional elevation taken on line 7—7 of Figs. 2 and 3.
Figure 8:
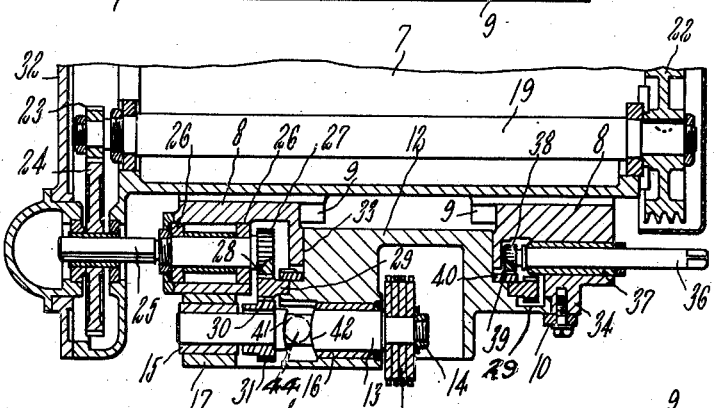
Fig. 8 is a detail horizontal section taken on line 8—8 of Fig. 7.
Figure 9:
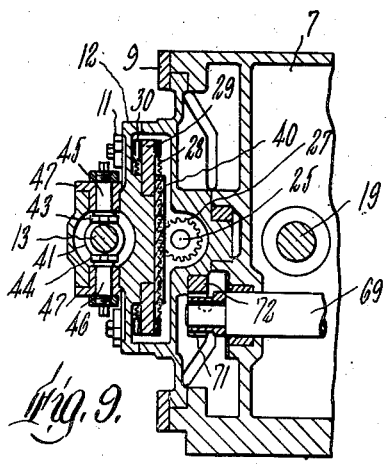
Figure 10:
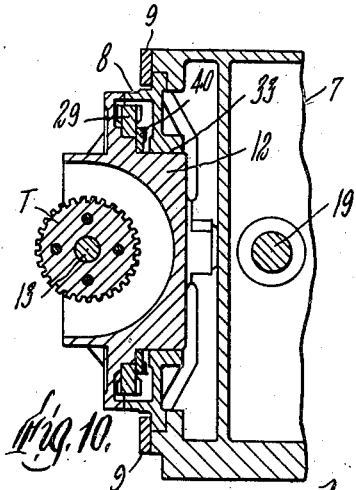

Figs. 9 and 10 are vertical cross sections taken on lines 9—9 and 10—10 respectively of Fig. 7;

Fig. 11 is a view similar to Fig. 7 showing a modification in the machine designed for finishing internal gears;

Fig. 12 is a horizontal section taken on line 12—12 of Fig. 11;

Fig. 13 is a vertical section taken on line 13—13 of Fig. 11;

Fig. 14 is an elevation on a larger scale, shown partly in section, of a novel tool designed for use with the machine herein disclosed, and of which the combination with other parts of the machine constitutes one phase of the present invention.

Fig. 15 is an enlarged detail sectional view of the tool taken on line 15—15 of Fig. 14;

Like reference characters designate the same parts wherever they occur in all the figures.

Figures 1, 1A:
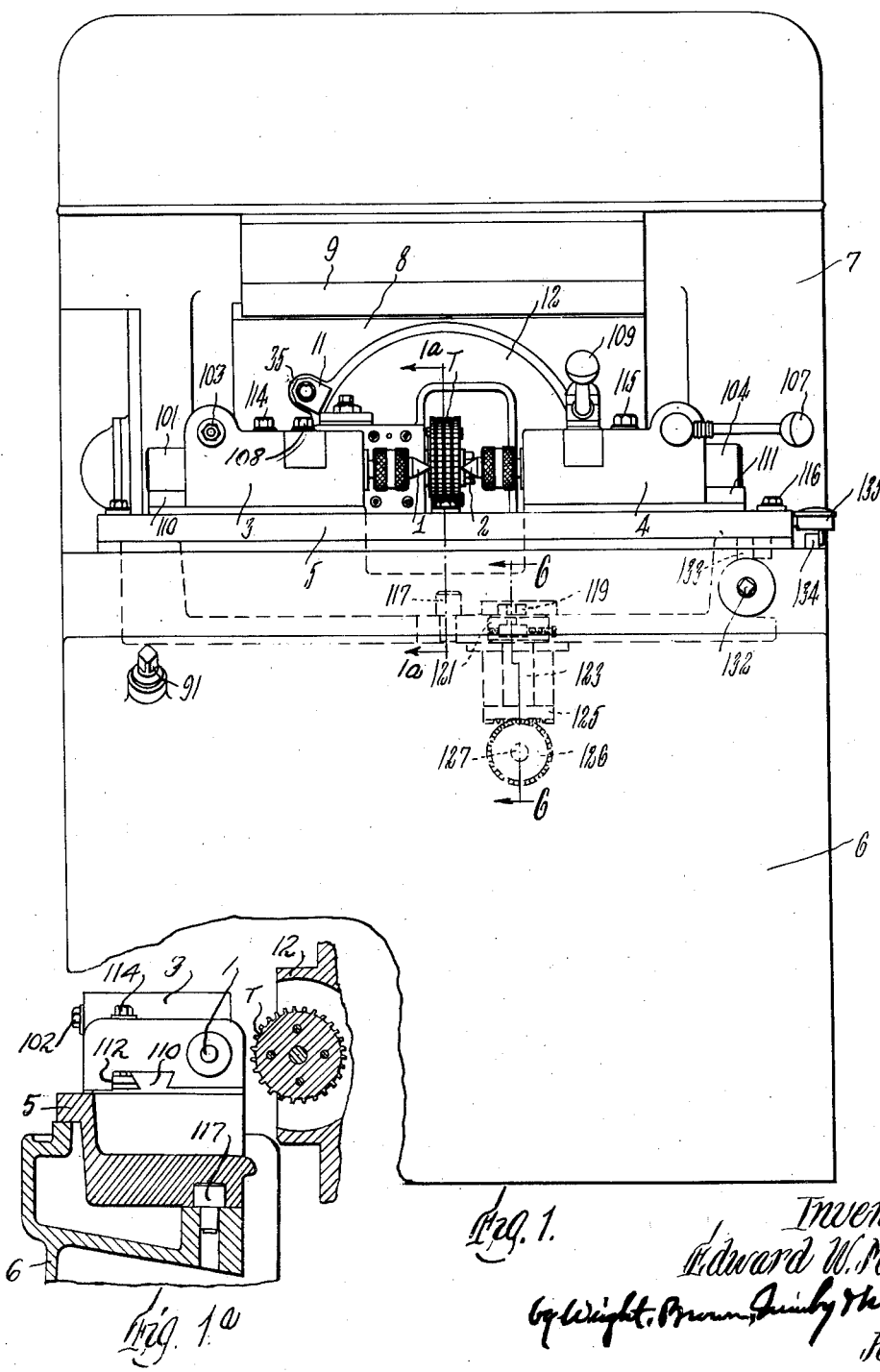
Fig. 1 is a front elevation of a machine embodying this invention.
Fig. 1a is a cross section of a portion of the machine taken on the line 1a—1a of Figures 1 and 5.
Figure 5:
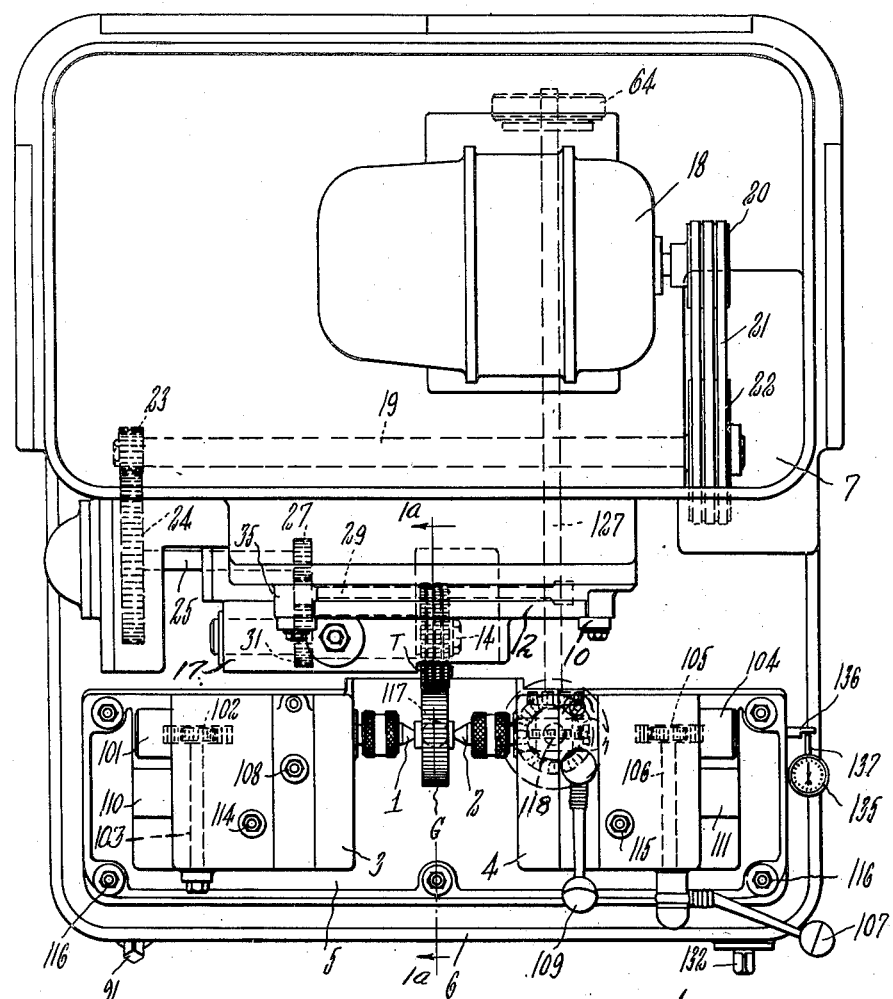
Fig. 5 is a plan view of the machine.
Figure 6:
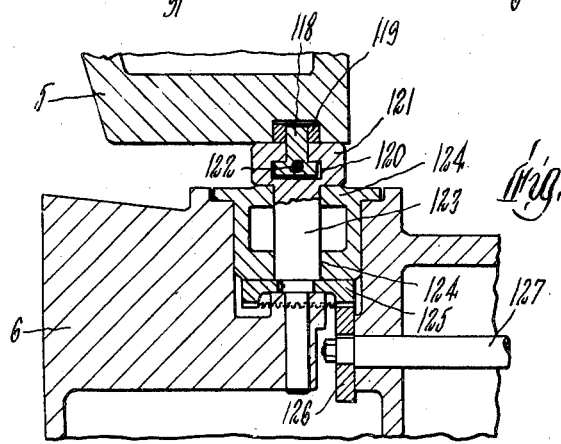
Fig. 6 is a detail sectional view taken on line 6—6 of Fig. 1.

The form of the machine shown in Figs. 1–10 inclusive is equipped to finish external gears, either spur or helical. The work gear G, which is shown in Fig. 5 but not in the other figures of the group above named, is mounted upon and between horizontal axially alined centers 1 and 2 supported by a head stock 3 and tail stock 4 respectively on a table 5. The tool T, here represented as a scraping or shaving tool having teeth with outlines conjugate to the teeth of the work piece, is supported rotatably with its axis parallel to the axial line of the centers 1 and 2 and in the same horizontal plane. In operation it is rotated about its axis, driving the work piece by gear action, reciprocated axially, and fed to a prescribed depth into the work by movement in a path which intersects its own axis and the axis of the work piece.

A base 6 supports the work table 5 and also a depth feed slide 7 which carries the tool and a large part of the mechanism for operating it. This depth feed slide is movable horizontally on the base in a forward and rearward direction, i. e., toward and away from the axis of the centers 1 and 2. A tool carriage 8 is mounted on the forward side of the depth feed slide in horizontal guideways 9 parallel to the axis of the centers. Affixed to this carriage by means of clamps 10 and 11 is a tool holder 12. A spindle 13 (Figs. 7–10), to which the tool is secured by a nut 14, is mounted rotatably in separated bearings 15 and 16 contained in a housing portion 17 of the holder.

The mechanism for rotating the tool and imparting a secondary or minor reciprocation to it consists of the following. A motor 18 mounted in the upper part of the depth feed slide 7 drives a shaft 19 by means of a belt and pulley drive 20, 21, 22. Shaft 19 carries a gear 23 meshing with a gear 24 in splined connection with a shaft 25, parallel to shaft 19, which rotates in bearings 26 in the carriage 8. Shaft 25 has thrust collars or shoulders embracing the bearings 26 and causing it to move with the carriage. It carries a gear 27 on its inner end meshing with teeth 28 on one face of a double face gear 29 which is mounted to rotate on the holder 12 in a plane between and parallel to spindle 13 and shaft 25. Teeth 30 on the opposite face of gear 29 from the teeth 28 mesh with a pinion 31 secured to the tool spindle 13.

The axes of face gear 29 and tool spindle 13 intersect at right angles, and the tool is positioned on the spindle 13 with its mid length at the intersection of those axes. The double face gear 29 transmits rotation from shaft 25 to the tool spindle continuously throughout the reciprocating movement thereof, and permits the spindle to be adjusted angularly in a vertical plane about an axis passing through the mid length of the tool for the purpose of correcting errors of angularity in the teeth of gears to be finished. Gears 23 and 24 are interchangeable with others for altering the rotational speed of the tool, being made accessible by removal of a cover plate 32 from the gear housing formed on the side of the depth feed slide.

The tool holder 12 is secured to the carriage 8 in a manner which permits adjustment of the tool spindle to any angle, between the limits hereinafter mentioned, at either side of its neutral position, wherein it is parallel to the axis of the work-holding centers 1 and 2. It has a cylindrical rear portion coaxial with gear 29 which fits a bearing 33 in the carriage. It also has a flange on its front portion overlying the face gear and a portion of the slide and contained between bosses 34 and 35 which protrude from the face of the carriage and support the clamps 10 and 11 respectively. The clamps overlap such flange for securing the holder in its adjusted position. The two bosses designated by the numeral 35 are positioned to act as stops in coaction with the housing 17, to prevent adjustment of the spindle either way from the horizontal position through an angle wider than sufficient to correct angle errors in gear teeth. An inclination of 5° is the maximum required for this purpose, and the bosses 35 are located to abut on the housing when the holder 12 has been turned to this angle in either direction.

For so adjusting the tool holder I have provided a shaft 36 contained in a bearing 37 in the tool carriage, having an outer end adapted to receive a wrench and carrying a pinion 38 on its inner end meshing with a face gear segment 39 on the retaining plate 40 which is fast on the tool holder and holds the face gear 29 in place.

The tool spindle is formed or provided with two face cams 41 and 42. A roll 43 engages cam 41 and a roll 44 engages cam 42. These rolls are mounted rotatably on the inner ends of studs 45 and 46 respectively which are mounted in alinement with one another at opposite sides of the spindle in bushings 47 secured in the housing 17. The portions of the studs which occupy the bushings are eccentric to those portions on which the rolls 43 and 44 are mounted, to provide an adjustment for taking up looseness and wear between the rolls and cams. The displacement of the cams is lengthwise of the spindle, wherefore as the spindle rotates, it, and the tool with it, are moved back and forth a short distance one or more times with each rotation. By virtue of its secondary reciprocation, the tool breaks up the chips, thereby performing a better cutting action and producing a better finish.

The main or fundamental reciprocation of the tool is effected by reciprocating the carriage 8 through the following mechanism. A motor 49 (Figs. 3 and 4) in the base 6 drives a shaft 50 by a pulley 51, belt 52 and pulley 53. Shaft 50 in turn drives a shaft 54 in the depth feed slide by means of pulley 55, belt 56, and pulley 57. Shaft 54 carries a gear 58 meshing with gear 59 on the outer end of a short shaft 60. A gear 61 on the inner end of shaft 60 drives a face gear 62 on a transverse shaft 63 (Fig. 2) which carries a crank disk 65 having a diametral slot in its outer face. A crank pin 65 is mounted to slide in the slot of the crank disk and is adjusted toward and away from the center thereof by a screw 66. A bar 67 having rack teeth 68 is connected with the crank 65 and passes across a shaft 69 carrying a pinion 70 with which the rack meshes. Shaft 69 extends in the front to rear direction and carries on its forward end a gear 71 meshing with a rack 72 (Fig. 3) on the carriage.

Rotation of the crank thus moves the carriage endwise back and forth. The extent of its travel is regulated by adjustment of the crank pin toward and away from its axis. The rate and speed of reciprocation is determined, and may be varied, by appropriate selection of gear pairs 58 and 59, which are accessible for removal in a housing on the end of the depth feed slide which is normally closed by a cover plate, not here shown. The rack bar 67 is guided and maintained in close mesh with gear 70 by a guide 73 which encloses gear 70 and has rotative bearing on the shaft 69. Supporting bearings for the several shafts are incorporated in the structure of the depth feed slide.

The depth feed movement of slide 7 is caused by the motor 49 through the following mechanism. Shaft 50, which is driven by this motor as above described, carries a two part planet pinion 74, 75 on an eccentric pin 76 projecting from one end of the shaft parallel to its axis. The gear part 74 meshes with an internal sun gear 77 which is made fast to the base structure, and the gear part 75 meshes with an internal sun gear 78 which is secured to a shaft 79. The ratios of the gear pairs 74—77 and 75—78 differ slightly, wherefore this assemblage constitutes a differential gear driving the shaft 79 at a slow rate in proportion to the speed of the motor. Shaft 79 carries a gear 80 meshing with a gear 81 on a shaft 82 which carries a cam 83, called for the purpose of this description the depth feed cam. Gears 80 and 81 are interchangeable with other pairs of different ratios for varying the rate of rotation of the cam.

A lever 84 carries a cam follower roll 85 which is pressed against the circumference of the depth feed cam by a spring 86 confined between lever 84 and an abutment on the base structure. This lever is supported rotatably by a shaft 87. A gear 88 is secured to shaft 87 and meshes with an intermediate gear 89, rotatably supported by the base structure, which meshes with a rack 90 secured to the under side of slide 7. The depth feed cam 83 is formed with a rising periphery of which the rise may be continuous or in steps, as desired, and, in the course of its rotation, it swings lever 84 toward spring 86. A gear 98 is fixed on shaft 87 and is coupled to lever 84 by a self locking worm 97 meshing with gear 98 and carried by an arm 99 which is in rigid union with arm 84. Therefore movement of lever 84 effected by cam 83 feeds the cutter toward that part of the work with which it is engaged.

The slide 7 may also be shifted manually; and for that purpose the worm 97 may be rotated by a shaft section 91 which protrudes from the front of the machine and may be rotated by a wrench. This last named shaft section is connected by a telescopic shaft composed of parts 92 and 93, and two universal joints, 94 and 95, with a shaft section 96 rotatably mounted in the arm 99 and by which the worm 97 is carried.

Returning to the work support, the center 1 is carried by one end of a massive center holder 101 which is fitted slidingly in the head stock 3 and is provided with rack teeth on its upper side meshing with a pinion 102, shown dotted in Fig. 5, on the inner end of a shaft 103 which passes transversely through the head stock and of which the outer end is accessible for application of a wrench. Center 2 is carried by a similar holder 104 similarly mounted in the tail stock 4, and having rack teeth engaged with a pinion 105 on a shaft 106 which carries an operating handle 107. The center holder 101 when set may be clamped by a screw 108 in the head stock, and the center holder 104 is clamped by a similar screw carrying a handle 109.

The head stock and tail stock are engaged with guideways 110 and 111 on the table, on which they may be moved for accommodating gears or gear clusters of different dimensions, and are made fast by clamps 112 and 113 respectively (Figs. 2 and 3) and nuts 114 and 115.

The table 5 is supported at its margins on the upper surface of the base, to which it may be rigidly secured by releasable clamp nuts 116 on bolts which rise from the base through slots in the table. The supporting surface of the base and the ways on the table whereon the head stock and tail stock are mounted are at a relatively high level with respect to the axis of the centers to support the centers rigidly and reduce "overhang" to the minimum. This feature gives superior control for prevention of misalinement of the axes of the centers when the head and tail stocks are shifted for the accommodation of various types of work. To provide room for work pieces of large diameter, the middle part of the table is depressed and sunk into the base within the marginal surface of the latter on which it is supported. By virtue of this construction, the machine has a large capacity, and at the same time, it supports the work against the thrust of the tool in a plane parallel to and near the line of thrust.

The table may be swung or inclined about a pivot 117 for the purpose of correcting for undesired taper in gear teeth, or to taper the teeth when desired, and it may also be oscillated about said pivot in time with the reciprocations of the tool carriage so as to produce a crowning effect on the teeth of finished gears. The pivot is mounted in the base structure and projects into the depressed midportion of the table. Its axis is perpendicular to the plane or planes of the table-supporting portions of the base and to the plane established by the axis of the centers 1 and 2 and the meshing point of the tool and gear. The pivot axis lies also in a plane which is perpendicular to the axis of said centers and is located substantially at the midpoint of the reciprocating path of the tool. In other words, said pivot is substantially perpendicular to the plane established by the axis on which the work piece is mounted and the path of that part of the tool, which bears on the work; said axis and path being parallel and, in the present embodiment, in the same horizontal plane. In addition, the pivot axis intersects the axis of the centers 1 and 2.

Oscillation of the table to crown the work gear teeth is caused by a crank pin 118 (Fig. 6) fitted to a slide block 119 which occupies a groove, parallel to the axis of the centers 1 and 2, in the under side of the table at one side of the pivot. The crank pin is mounted and adjustable in a radial slot 120 in a crank head 121, by means of a screw 122. The head 121 is secured to the upper end of a shaft 123 mounted in bearings 124 in the base. A face gear 125 is secured to shaft 123 and meshes with a gear 126 on a shaft 127 which extends from front to rear in the base and carries a sprocket 128 (Fig. 2) driven by a chain 129 from a sprocket on the crank shaft 63 which reciprocates the tool carriage. Shaft 127 is journaled in a bearing 130 suspended from the depth feed slide 7 and the sprocket 128 is splined to the shaft and coupled rotatively with this bearing to permit shifting of the depth feed slide as previously described without deranging the sprocket and chain drive.

The speed ratio of shafts 63 and 123 is one to one, as is also the ratio of gears 125 and 126, whereby the table is oscillated in time with the reciprocations of the tool. And the crank pin 118 is so located as to cause each end of the table to swing toward the path of the tool as the tool travels from the midposition of its stroke toward that end of the table. Thus, for example, as the tool travels toward the right from midposition, the right hand end of the work gear is gradually swung toward it until the tool reaches the end of its travel. On the reverse travel of the tool the right hand end of the work piece is gradually swung away from, and the left hand end toward, the tool until the travel of the tool is again reversed. Thus the teeth of the work piece are cut more deeply at each end than in the middle, which gives them a crowned or barrel formation. To permit such operation, the clamp nuts 116 are relaxed enough to free the table.

When it is desired to finish gears without crowning their teeth, the crank pin 118 is removed and the table is clamped fast on the base by the nuts 116.

Alternatively, the table may be adjusted to an invariable angle to the path of the tool, and for so adjusting it I have provided a worm 131 (Fig. 2) mounted on a shaft 132 which projects from the front of the machine and is adapted to receive a wrench on its outer end. The worm meshes with rack teeth on a web 133 which depends from the under side of one end of the table. The machine base is provided with a stud 134 (Fig. 1) on which a multiplying indicator 135 may be mounted for measuring or checking the angular position of the table; and the table is provided with a stud 136 to engage the plunger 137 of the indicator. The worm 131 and its shaft 132 are removed when the mechanism for giving the work crowning movement to the table is in operation.

The machine as hereinbefore described is capable of finishing external gears only. It may, however, be set up for finishing internal gears by substituting a different tool holder and a different work holder. These substitutions are shown in Figs. 11, 12 and 13. The alternative tool holder here used is shown at 138. It is mounted on the carriage 8 in the same way and by the same means as the tool holder 12. It is provided with a forwardly extending bracket portion 139 in which not only the tool spindle 13a is mounted, but also a shaft 140 geared to the spindle 13a by changeable gears 141 and 142. The shaft 140 carries a pulley 143 which is coupled to the driving motor pulley by a belt 21a. Face cams 41a and 42a coacting with abutment rolls 43a and 44a, as previously described, give a secondary short reciprocation to the tool. The main or fundamental reciprocation is given by movement of the carriage 8, as described. The holder is tiltable through a small angle for correcting angle errors in gear teeth and the extent of its tilting movement is limited by contact of the bracket extension 139 with the clamp holding lugs 35 above and below the bracket.

A work holding fixture 144 is secured to table 5 in substitution for the tail stock 4 and contains a shaft or spindle 145 on which the internal gear $G^1$ to be finished is secured. The internal gear here shown is one having a web at one end with a central hole adapted to be passed over the spindle and secured thereto by a washer and nut. But it will be obvious that a chuck or face plate, or other well known means for holding work pieces, may be applied to the spindle for supporting internal gears of other types.

External or internal gears, both those in which the teeth are parallel to the axis of the gear, and those in which the teeth are helical, may be finished in this machine. When spur gears or internal gears with teeth parallel to the axis are finished, a tool having spur gear characteristics is used. When helical gears, either external or internal, are finished, a tool of helical gear character with a helix angle equal to that of the gear being finished is used; the tooth helices being of opposite inclination for external gears, and of the same inclination for internal gears. The tools may be solid or laminated, and the cutting edges may be formed by grooves cut in the sides of their teeth or slots cut entirely through the teeth.

One phase of the invention consists in the novel combination between the operating means of the machine here described and a tool made of disks assembled in axial alinement having teeth on their circumferences and formed with side clearance and with a top rake if desired. Figs. 14 and 15 illustrate one such tool of spur character. It is composed of disks $d$, of material suitable for cutting tools, each having teeth $t$ on its circumference. The disks are clamped together by bolts 146 and nuts 147. As shown in the enlarged view, Fig. 15, the teeth of each disk have side clearance at opposite sides so that they engage the work only on their cutting edges $e$ and $e'$. The edges $e$ cut during the stroke from right to left, and the edges $e'$ during the strokes in the opposite direction. The relieved formation enables the tools to cut away high parts of the work rapidly and without need of exertion of excessively heavy lateral pressure between the tool and work; and the action of cutting by axial movement avoids danger of the relieved edges removing too much stock when the rotation of the work is controlled only by the tool. In consequence of these factors, the result is accomplished of rapidly finishing gears to prescribed form and dimensions with ample accuracy when the cutter has been fed to the prescribed depth.

Various other arrangements of cutting edges are possible within the scope of this phase of the invention and of the protection which I claim for it; some of which are disclosed in another patent application filed by me. The teeth of the several disks may likewise be formed with a top rake, represented by the beveled faces shown at $r$ in Fig. 14.

Tools otherwise like that here shown, but adapted to finish helical gears, are constructed of disks with teeth of helical gear formation but containing a clearance angle in their side faces, and such disks are assembled with their cutting edges in helical alinement corresponding to the alinement of points on the faces of helical gear teeth spaced apart equally to the spacing between the cutting edges of adjacent disks. That is, whereas in a tool of spur gear character the cutting edges are located in lines $h, h$ and $k, k$ parallel to the axis of the tool, in a helical tool the lines corresponding to $h, h$ and $k, k$ are helical.

Other phases of the invention are not limited to the use of any specific tool, and so far as those are concerned, shaving tools of known types may be used.

The mode of operation of the machine will be plain from the foregoing description, without need of further explanation. It may be observed, however, that, since the rotation of the work is controlled only by the tool, the strokes of the tool are so limited as to maintain meshing engagement with the work at all times. That is, the tool is arrested and reversed at the end of each stroke while one end remains in mesh with one end of the work piece. When spur gears are being finished, the rotation of the work gear is that due to the rotational movement only of the tool; but in the finishing of helical gears the endwise movement of the tool gives an additional or incremental rotation to the work. The teeth of a tool for finishing helical gears are likewise helical, as previously stated. Hence as the tool reciprocates, its teeth have a cam action turning the work piece relatively to its driven rotation by the tool, alternately in the same direction and in relatively the opposite direction.

The cutting action is due entirely and exclusively to the reciprocation of the tool, and the speed of reciprocation is made such as to effect an efficient cutting action. The speed of cutting may be varied by changing the ratio of the gear pair 58, 59 in accordance with the material of the work piece or other factors which influence the desirable speed. No part of the cutting effect is due to rotation of the tool, for its cutting edges rotate in planes perpendicular to the axis of the work, or substantially so, for even when it is adjusted angularly to correct errors in the angle between the teeth and diametral planes of the work gear, the inclination is not sufficient to cause any appreciable cutting due to endwise slip while the meshing teeth pass through their arc of action.

A new method of cutting is carried out with the aid of the machine described and equivalents thereof, which method contains a phase of the invention. It consists in effecting a relative reciprocating motion between a series of tandem cutting edges and the faces of a gear to be finished, in the direction of the axis of the latter, at a sufficiently rapid rate for efficient cutting action in alternately opposite directions, while causing the opposite sides of at least one tooth of the tool to be always in contact with two teeth of the work piece, and continuously rotating the tool and work piece, driving one by the other, a number of times. The speed of rotation is not important except as rapidity of production is economically important. But the work piece must be rotated enough times to bring its teeth repeatedly in the field of cutting action in order to eliminate errors of spacing and eccentricity. Preferably in all cases where it is possible, a cutter is selected of which the number of teeth is prime to the number of teeth of the gear being finished.

Although certain parts of the machine are described in the foregoing specification in terms of their relationship to the plane of the horizon, such description is in no wise a limitation of the invention. Certain practical advantages inhere in a machine of this character by virtue of a horizontal placement of the axes of tool and work, with both axes at the same level. But either axis may be located above the other, or both may be mounted vertical or at an inclination, and other parts of the machine correspondingly altered without departing from the invention. So also may other changes be made within my sphere of protection. The claims are to be construed in the light of this explanation.

What I claim and desire to secure by Letters Patent is:

1. A gear finishing machine comprising a shaving tool, means for supporting said tool and a gear to be finished rotatably with their axes substantially parallel and with their teeth intermeshing, means for rotating one of said elements constituting the tool and work gear, means for reciprocating one of said elements axially, and means for imparting a secondary axial reciprocation to said reciprocating element.

2. A gear finishing machine comprising a supporting structure, a carriage supported by said structure and guided to move thereon in a fixed path, a spindle rotatably mounted on said carriage with its axis substantially parallel to said path, said spindle being adapted to carry a gear finishing tool or a gear to be finished, means for reciprocating said carriage and thereby the spindle, means for rotating said spindle, and means for imparting to the spindle a secondary axial reciprocation in the course of its rotation.

3. A gear finishing machine comprising a supporting structure, a carriage mounted on said structure and guided to move in a prescribed path, a spindle rotatably held by said carriage with its axis substantially parallel to said path, said spindle having encircling face cams, abutments mounted on the carriage engaging said face cams, and means for rotating the spindle, said cams and abutments causing a reciprocating motion of the spindle secondary to that caused by movements of the carriage.

4. A gear finishing machine comprising a supporting structure, a carriage guided to move reciprocatively on said supporting structure in a prescribed path, means for reciprocating the carriage, a normally stationary table mounted on the supporting structure in rigidly supported engagement therewith at its opposite ends, adjacent to said carriage having means for holding a gear to be finished or a gear finishing tool rotatably with its axis parallel to the path of the carriage, a spindle rotatably mounted on the carriage with its axis substantially parallel to the path of reciprocation of the carriage adapted to hold a gear finishing tool or a gear to be finished, and means for rotating the spindle; said table being angularly adjustable about an axis perpendicular to the plane or planes of its engagement with the supporting structure to place the axis of the holding means thereon at an inclination to the axis of the spindle in the same plane with said spindle axis.

5. A gear finishing machine comprising a supporting structure, a carriage guided to move reciprocatively on said supporting structure in a prescribed path, means for reciprocating the carriage, a table mounted on the supporting structure adjacent to said carriage having means for holding a gear to be finished or a gear finishing tool rotatably with its axis parallel to the path of the carriage, a spindle rotatably mounted on the carriage with its axis substantially parallel to the path of reciprocation of the carriage adapted to hold a gear finishing tool or a gear to be finished, and means for rotating the spindle; the table being rigidly supported at its ends and pivoted to swing about an axis substantially perpendicular to the axis of the holding means thereon, and means for swinging the table back and forth in time with the reciprocations of the carriage in a manner to cause finishing of the work gear teeth with a crowned formation.

6. A gear finishing machine comprising a supporting structure, a carriage guided to move on said supporting structure in a prescribed path, means for reciprocating the carriage in said path, a spindle rotatably mounted on the carriage with its axis substantially parallel to said path, a table mounted on the supporting structure having means for supporting a work piece with its axis parallel to the axis of said spindle, the table being pivotally mounted to swing about an axis substantially perpendicular to the plane of the previously named axes, and adjacent to the second named axis, a crank engaging said table at a point eccentric to the pivotal axis thereof and mounted to move in a path causing the table to swing about its pivot axis, and means for rotating said crank at a rate causing the crank to make one rotation in the same time as one back and forth reciprocation of the carriage.

7. A gear finishing machine comprising a supporting structure, holding means adapted to support a work piece rotatably with its axis in a given location, a carriage mounted on the supporting structure and guided to move in a rectilinear path substantially parallel to said axis, a spindle holder mounted on said carriage, a spindle rotatably mounted in the spindle holder with its axis substantially parallel to the path of movement of the carriage, said holder being angularly adjustable on the carriage to permit inclination of the spindle axis at a small angle to said path, the carriage and spindle holder having complemental stop means for limiting such angular adjustment, mechanism for reciprocating the carriage, and mechanism for rotating the spindle.

8. In a machine of the character described, a supporting structure, a spindle holder angularly adjustable on said supporting structure, a spindle rotatably mounted in said spindle holder with its axis transverse to the axis of adjustment of the holder, a gear secured coaxially to the spindle, a face gear mounted on the spindle holder coaxial with the axis of angular adjustment thereof having teeth on opposite faces, the teeth of one face being in mesh with said spindle gear, and a driving gear in mesh with the teeth on the opposite face of said face gear.

9. In a machine of the character described, a supporting structure, a carriage guided to move translatively on said supporting structure in a given path, a spindle holder mounted on said carriage with capacity for angular adjustment about an axis transverse to said path, a shaft rotatably mounted in the carriage substantially parallel to the path of movement thereof, driving means for said shaft mounted on the supporting structure and having a longitudinally shiftable engagement therewith, a face gear rotatably mounted on the spindle holder coaxial with the axis of angular adjustment thereof having teeth on opposite faces in planes substantially perpendicular to said axis, a gear on said shaft in mesh with the teeth on one face of said face gear, a spindle rotatably mounted in the spindle holder at the opposite side of the face gear from said shaft, and a gear on the spindle in mesh with the teeth of the face gear at the side thereof opposite to the teeth which mesh with the previously named gear.

10. In a gear finishing machine, a supporting structure, a reciprocating carriage, a spindle rotatably supported by said carriage with its axis substantially parallel to the path of reciprocating movement of the carriage, the carriage having rack teeth in a line substantially parallel to said path, a rock shaft mounted transverse to said path, a rack bar movable endwise across said shaft, the shaft having gear elements meshing respectively with the before named rack teeth and the rack bar, a rotatable crank connected with said rack bar for reciprocating it, driving means for rotating said crank, and driving means for simultaneously rotating said spindle.

11. A gear finishing machine comprising a supporting structure, a depth feed slide mounted to move in a given path on said supporting structure, a carriage mounted on the depth feed slide to reciprocate in a path transverse to the path of the slide, a spindle mounted rotatably on the carriage with its axis substantially parallel to the path of the carriage, a driving motor mounted on the depth feed slide, gearing between said motor and the spindle for rotating the latter, a depth feed cam mounted on the supporting structure, a driving shaft mounted on the supporting structure, a train of gearing between said shaft and the carriage, including a crank, for reciprocating the carriage, reducing gearing between said shaft and depth feed cam for driving the cam, and connections between the depth feed cam and depth feed slide for imparting movement to the slide when the cam is rotated.

12. The method of finishing gears which consists in providing a finishing tool having teeth of which the profiles are conjugate to the prescribed final form of the teeth of the gear to be finished, mounting such tool and the work gear rotatably with their axes substantially parallel to one another and their teeth in mesh, reciprocating the tool axially a multiplicity of times, and rotating it a number of times in the course of finishing a single gear, and oscillating the gear in time with the reciprocations of the tool about an axis substantially perpendicular to the common plane of the tool and gear axes and located between the end faces of the gear substantially in intersecting relation with the axis thereof.

13. In a machine of the character described, a base and a table supported at its margin on the base, said table having means for supporting a rotatable work piece with the axis thereof relatively near to the plane of the supported margin of the table, and the table being recessed within the supporting plane of the base in the locality of its work supporting means, whereby to permit mounting and rotation of work pieces having a radius greater than the distance from the axis of the work to said plane of support.

14. In a machine of the character described, a base, a tool holder and a work holding table mounted on the base, a rotatable tool spindle carried by the tool holder, means on the table for mounting a work piece rotatably in position to be acted on by a tool secured to said tool spindle, the base having supporting means for the table engaging the marginal portion thereof in a plane substantially parallel both to the axis of the work piece and to the direction in which pressure is exerted by the tool on the work piece, the base having a recess adjacent to its table supporting means, and the table being constructed to extend into such recess and having an open space including and contiguous to the work piece location extending across the plane of the table supporting means and into said recess, whereby capacity is afforded for operation upon work pieces of larger radius than the perpendicular distance from the work piece axis to the plane of the table supporting means.

15. In a machine of the character described, a base, a tool holder, a tool spindle rotatably mounted in said tool holder, a table supported on the base having means for rotatably supporting a work piece and the axis thereof substantially parallel to the axis of said spindle, the table being constructed with a recessed portion providing an open space contiguous to the prescribed location of the work piece and the base having supporting means for the margins of the table including a portion engaging the margin of the table in a plane substantially parallel to the common plane of the spindle and work piece axes and at a distance from the latter plane less than the extent of the table recess from the axis of the work piece.

16. In a machine of the character described, a base, a work holding table mounted on the base, head and foot stocks having work supporting elements in axial alinement and being mounted on the table in guided engagement therewith for relative movement toward and away from one another in the direction of such alinement, and tool holding means on the base arranged to present a tool in position to bear against a work piece mounted on and between said work supporting elements and to exert thrust in a line transverse and substantially in the same plane with the axis of the before named alinement; the engaging portions of said table and head and foot stocks being in a plane substantially parallel and relatively near to the plane established by said axial alinement and line of thrust, and the table being offset in the region between the head and foot stocks away from said axial alinement to accommodate work pieces of greater radius than the distance between said planes.

17. A machine of the character described comprising a base, a table on the base, head and foot stocks mounted in guided engagement on said table with provisions for relative movement toward and away from one another, work supporting elements on the head and foot stocks respectively in axial alinement parallel to the line of said relative movement, and means for supporting a tool for engagement with a work piece mounted on said work supporting elements; the table being supported at its margins on the base, and being offset between the head and foot stocks away from the locations of the work piece and tool, the base having a recess receiving the offset portion of the table.

18. A gear finishing machine comprising a supporting structure, a table mounted on said structure having bearing means for mounting a work gear rotatably alined parallel to the plane on which said table is supported by the base, a carriage mounted on the base and guided to move in a path parallel to the line of said bearing means, a spindle mounted rotatably in said carriage adapted to mount a gear finishing tool and arranged with provisions for adjustment angularly about an axis transverse to said path and to said line and to the axis of the spindle, and a pivot interengaged between the supporting structure and table permitting angular adjustment of the table; the axis of said pivot being substantially perpendicular to the table-supporting surface of the base and to the line of said work supporting bearing means, whereby to incline the line of said bearing means to the path of a tool mounted on said spindle and in substantially the same plane with said path.

19. A gear finishing machine comprising a supporting structure, a carriage mounted reciprocatively on said supporting structure and adapted to carry a gear finishing tool in a prescribed path, means for reciprocating the carriage, a normally stationary work table having means for supporting a work gear rotatably with its axis parallel to the said path, means connecting said table with the base in a manner permitting angular displacement of the table to place the axis of rotation of the work gear at an angle to the path of the finishing tool, while maintaining the said axis in the same plane with said path, and a multiplying indicator interengaged between the base and table for measuring angular displacement of the table.

20. A gear finishing machine comprising a base, a table mounted on said base and supported rigidly at its ends thereon with provision for adjusting displacement oppositely to one another in substantially parallel paths, a pivot interconnecting said base and table, located between the ends of the table with its axis substantially perpendicular to the plane in which the ends of the table are so displaceable, a carriage supported by the base with provisions for reciprocating movements in a path substantially parallel to the table, a gear finishing tool mounted rotatably on the carriage, means on the table arranged to support a work piece rotatably with its axis substantially perpendicular to said pivot and parallel to the directions in which the carriage travels, the finishing tool being located on the carriage in position to mesh with the teeth of the work gear, and means for imparting reciprocating movement to the carriage.

21. A gear finishing machine comprising a base, a table, a pivot in coupling relation to said base and table located between the ends of the table, and said table ends being rigidly supported by the base with provisions for displacement over the base in a plane or planes perpendicular to the pivot aixs, a carriage supported by the base in a manner permitting it to reciprocate in a path substantially parallel to the plane of angular displacement of the table about said pivot, work supporting means on the table arranged to mount a work gear rotatably with the axis thereof substantially intersecting and perpendicular to the axis of the pivot and parallel to the path of reciprocation of the carriage, a gear finishing tool supported rotatably on the carriage in position to mesh with a work gear on said work supporting means at a point substantially in the diametral plane of the work piece which is perpendicular to the pivot axis, the pivoted relation of the table to the base enabling the table to be set with the axis of the work supporting means at different inclinations to the path of the tool.

22. A gear finishing machine as set forth in claim 21, combined with means for clamping the table to the base in its various positions of adjustment.

23. A gear finishing machine as set forth in claim 21, combined with means for shifting the table back and forth in time with the reciprocations of the carriage.

24. A gear finishing machine as set forth in claim 21, combined with means for moving the table angularly in one direction about the pivot during the travel of the carriage in one direction, and for reversely moving the table angularly during travel of the carriage in the opposite direction.

25. A gear finishing machine comprising a supporting structure, a depth feed slide mounted to move in a given path on said supporting structure, a carriage mounted on the depth feed slide to reciprocate in a path transverse to the path of the slide, a gear finishing tool rotatably supported by the carriage, a table on the supporting structure having means for supporting a work gear rotatably with its axis of rotation parallel to the path of said carriage and transverse to the path of said depth feed slide and in substantially the same plane with the path in which the center of the tool is transported by movements of the depth feed slide, means for reciprocating the carriage, and means for shifting the depth feed slide in its prescribed path comprising a motor, a cam propelled rotatably by said motor, a pivotally mounted arm in relation with said cam to be shifted thereby, and transmission gearing between the arm and slide.

26. A gear finishing machine comprising a supporting structure, a depth feed slide mounted to move in a given path on said supporting structure, a carriage mounted on the slide to reciprocate in a path transverse to the path of the slide, means for supporting and driving a finishing tool rotatably on the carriage, means on the supporting structure for mounting a work gear rotatably across the path in which the tool is transported by movements of the depth feed slide, a cam rotatably mounted on the supporting structure, an arm pivotally mounted on the supporting structure and including a follower engaged with the cam to be shifted thereby, means for driving the cam, a gear adjustably interlocked with said arm, and transmission means between said gear and the depth feed slide arranged to impart movement to the latter.

27. In a gear finishing machine, a supporting structure, a slide mounted on said structure to move in a given path, a feed cam rotatably mounted on the supporting structure, a cam follower oscillatively mounted on the supporting structure in engagement with said cam, means for rotating the cam, and gearing interposed between said cam follower and slide for transmitting movement to the slide when the follower is displaced by the cam.

28. In a gear finishing machine, a supporting structure, a slide mounted on said structure to move in a given path, a feed cam rotatably mounted on the supporting structure, a cam follower oscillatively mounted on the supporting structure in engagement with said cam, means for rotating the cam, gearing interposed between said cam follower and slide for transmitting movement to the slide when the follower is displaced by the cam, and means for adjusting the angular relation between the cam follower and gearing, whereby to shift the limits of the path in which the slide is moved by the cam.

29. In a gear finishing machine, a supporting structure, a slide mounted on the supporting structure, a cam mounted rotatably on the supporting structure, an oscillative cam follower device in pivoted connection with the supporting structure and engaged with the cam for displacement thereby, a gear concentric with the axis of said cam follower device in adjustable interlocked relation with the cam follower device, and intermediate connections organized to transform rotation of the gear into translative movement of the slide.

30. In a gear finishing machine, a supporting structure, a shiftable superstructure supported thereby with provision for movement in a given path, a cam mounted on the supporting structure, means for driving said cam, a cam follower device mounted for angular movement on the supporting structure in contact with the face of said cam, a gear mounted coaxially with the center of angular movement of said follower device, a self locking worm carried by said device in mesh with said gear and operable to shift the angular relation between the gear and follower device, and connections through which said gear when rotated causes displacement of the superstructure.

31. A gear finishing machine comprising a supporting structure, a work table on said structure supported thereby at its ends and in pivotal connection therewith to swing about an axis intermediate its ends, said table having means for holding rotatably a gear to be finished with its axis of rotation substantially perpendicular to the pivotal axis of the table, the table supporting portions of said supporting structure lying in planes substantially parallel to said axis, a tool spindle holder mounted on the supporting structure, a tool spindle rotatably held by said spindle holder adapted to carry a finishing tool in position to act on a work gear held by the gear holding means, means for rotating said spindle, means for effecting relative traverse between the tool holder and table lengthwise of the axis of rotation of the gear, and means for causing the table to turn about its pivotal axis during such traverse in a manner to cause finishing of the work gear teeth with a crowned formation.

32. A gear finishing machine comprising a supporting structure, a tool spindle holder mounted on said structure, a tool spindle rotatably held by said holder and adapted to carry a finishing tool, a work table having means for holding rotatably a gear to be finished, said table being in pivotal connection intermediate its ends with the supporting structure to turn about an axis in substantially intersecting and perpendicular relation to the axis of rotation of the gear and in a location such that a gear held by said holding means is presented in operative relation to a tool carried by said spindle, and the supporting structure having table supporting portions in planes substantially parallel to said axis of rotation on which the table rests, means for rotating said spindle, means for causing a relative reciprocation to take place between the table and spindle holder lengthwise of the axis of rotation of the work gear, and means for swinging the table back and forth in time with the strokes of such relative reciprocation in a manner to cause the work gear teeth to be finished with a crowned formation.

33. A gear finishing machine comprising the combination with a work holding table rigidly supported at its margin with provision for angular movement on its plane of support adapted to support a gear rotatably, a carriage mounted to reciprocate in a path parallel to the axis of rotation of the gear so supported, a spindle mounted rotatably on said carriage in position to hold a toothed gear finishing tool in mesh with such gear, means for rotating said spindle, and means for reciprocating the carriage; of a pivot engaging said table arranged with its pivot axis perpendicular to the plane of support of the table and to the plane established by the rotational axis of the work and the pitch point between the work piece and tool, said pivot axis being also in a plane perpendicular to the path of the tool and approximately midway between the limits of travel of the tool, and means for oscillating the work holder around such pivotal support in time with the reciprocations of the carriage.

34. A gear finishing machine as set forth in claim 33, in which the said means for oscillating the work holder is arranged to swing the holder in one direction of rotation about the pivotal support during the strokes of the carriage in one direction and to swing the work holder in the opposite direction of rotation during strokes of the carriage in the opposite direction.

EDWARD W. MILLER.